Patented Apr. 20, 1926.

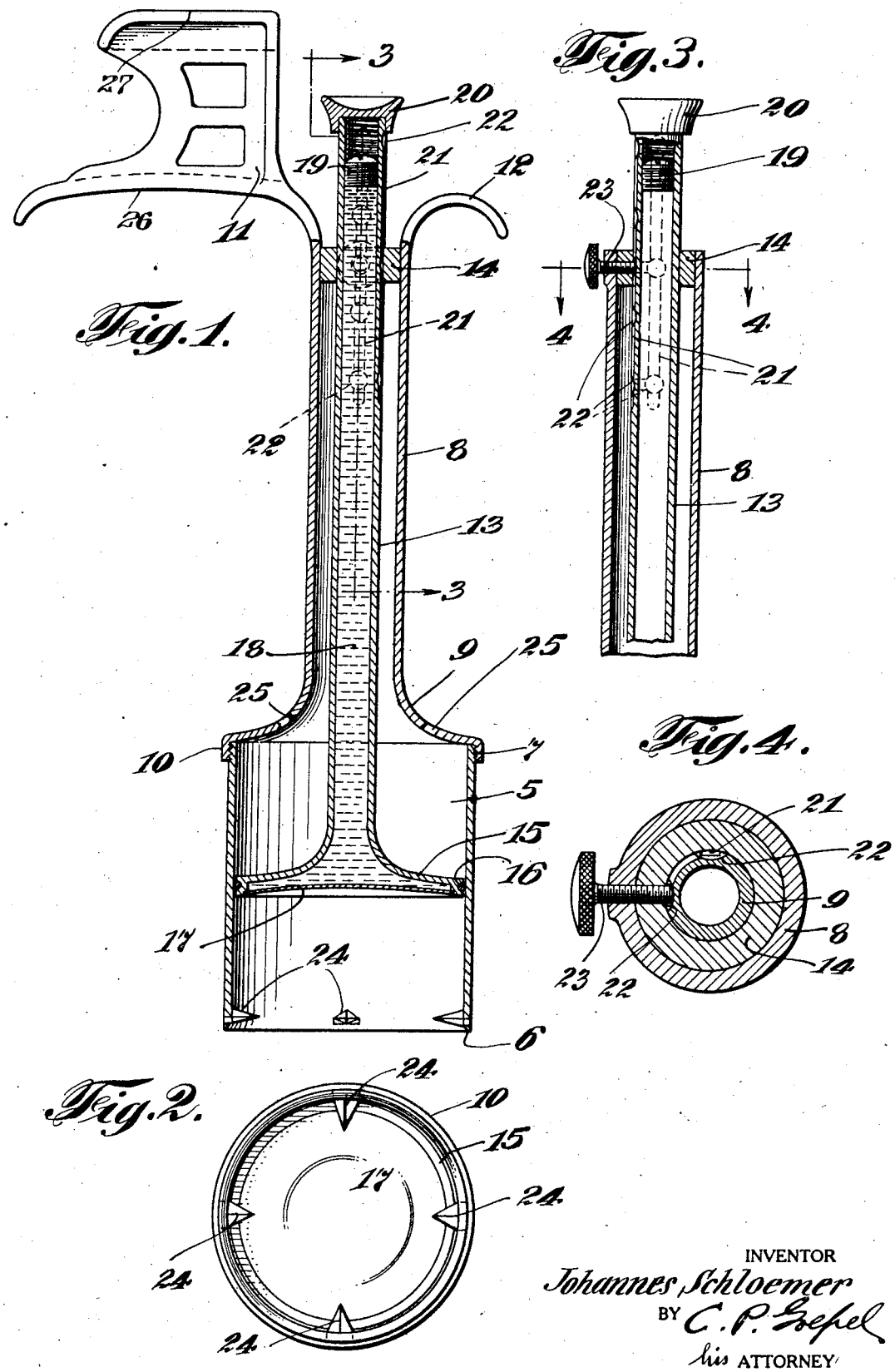

1,581,493

UNITED STATES PATENT OFFICE.

JOHANNES SCHLOEMER, OF NEW YORK, N. Y.

ICE-CREAM DISHER AND MEASURER.

Application filed January 24, 1925. Serial No. 4,361.

*To all whom it may concern:*

Be it known that I, JOHANNES SCHLOEMER, a subject of the Republic of Germany, and resident of New York, in the county of New York and State of New York, have invented certain new and useful Improvements in Ice-Cream Dishers and Measurers, of which the following is a specification.

This invention relates to an improved ice cream dipper, and has for its primary object to provide a simple and quickly operated device for removing ice cream in accurately measured quantities from cans or containers to be placed in individual plates or receptacles.

It is another important object of my present improvements to provide a device of this kind which is so constructed that desired quantities of different kinds or flavors of ice cream may be first collected in superimposed relation and then ejected or dispelled from the device in such layer formation.

It is a further object of the invention to provide means embodying a movable plunger operating within a shell or casing, whereby said casing and the plunger may be easily manipulated by the use of one hand. My invention also provides improved means whereby the sticking or adhesion of the ice cream to the surface of the plunger is prevented.

With the above and other objects in view, the invention consists in the improved ice cream dipper, and in the form, construction and relative arrangement of its several parts as will be hereinafter more fully described, illustrated in the accompanying drawings, and subsequently incorporated in the subjoined claims.

In the drawing, wherein I have illustrated one simple and practical embodiment of the invention, and in which similar reference characters designate corresponding parts throughout the several views,—

Figure 1 is a vertical sectional view illustrating a preferred embodiment of the device;

Fig. 2 is a bottom plan view of the device;

Fig. 3 is a detail vertical section taken on the line 3—3 of Fig. 1, and

Fig. 4 is a horizontal sectional view taken on the line 4—4 of Fig. 3.

Referring in detail to the drawing, 5 designates the receiving shell for the ice cream, which in the present instance, is in the form of a cylindrical sheet metal tube provided at one of its ends with the circular cutting edge 6, and at its other end with the exterior threads 7.

The shell 5 is carried by a suitable handle member, said member as herein shown including a tubular portion 8 flared at one of its ends as at 9 and provided with an annular internally threaded flange 10 for engagement with the external threads 7 on the end of the shell 5. At its other end, this tubular portion 8 of the handle member is provided at one side thereof with a laterally projecting hand-grip 11 which is in the form of a vertical disposed plate. The fixed portion 26 of the hand grip 11 is adapted to be engaged by the third, fourth and fifth fingers and the fixed portion 27 above it by the palm of the hand. These two fixed portions 26 and 27 are spaced apart about the distance of the normal grip of a normal person. At the opposite side of the tubular portion 8 of the handle member opposed to the fixed portion 26 of the hand grip 11, an outwardly turned finger grip 12 is provided with which the forefinger of the hand is adapted to be engaged.

A hollow metal rod 13 is arranged within the tubular portion 8 of the handle in concentric relation thereto and is movable through a bushing 14 tightly fitted in the outer end thereof. One end of this hollow rod 13 is outwardly flared to provide a plunger head 15 having a peripheral flange thereon carrying a suitable packing ring indicated at 16 for engagement with the inner surface of the cylinder or shell 5. The outer side of the plunger head is closed by a thin concave metal plate 17 securely fixed at its outer edge to the marginal flange of said plunger head, whereby a fluid-tight connection is produced between said metal disc and the head.

The interior of the hollow rod 13 and of the plunger head 15 is adapted to be filled with alcohol as indicated at 18, and the outer end of said hollow rod is provided with a fluid-tight closure herein shown in the form of a plug 19 threaded or otherwise securely fixed within the end of said rod. This end of the rod carries a suitable finger piece 20 with which the thumb of the hand grasping the hand-grip 11 is adapted to be engaged.

The outer end portion of the plunger rod 13 is provided with one or more longitudinally extending grooves 21 therein and at spaced points in the length of each groove circular seats 22 are formed to receive the inner end of a set screw 23 which is threaded in the wall of the rod 13 and in the bushing 14. It will be noted from reference to Fig. 3 that when circumferentially spaced grooves 21 are provided, the seats 22 associated with the respective grooves are differently spaced.

The shell 5 at its open end is provided with suitable radially projecting cutting means. In the present instance, I have shown this cutting means in the form of a plurality of spurs 24 provided with both vertical and horizontal cutting edges.

In order to prevent any air cushioning effect upon the plunger head 15, the lower flared end of the handle member 8 is provided with a plurality of vent openings 25 in the wall thereof.

It will be understood that the seats 22 are properly spaced apart in accordance with different positions of the plunger head 15 with relation to the open end of the shell 5 which determines the quantity of ice cream which may be received within said shell. In the use of the device, the screw 23 is first loosened and the rod 13 moved through the guide bushing 14 to adjust the position of the plunger 15 within the shell. The screw is then tightened and engaged in one of the seats 22. The operator now firmly grasps the hand-grip in the palm of the hand and engages the forefinger with the out turned lip 12 and then forces the shell 5 downwardly into the body of ice cream in the can or container until further movement is stopped by the plunger head 15. A rotative or turning movement is then imparted to the device so that the knife edge spurs 24 will horizontally cut through the ice cream adjacent the juncture of the cream within said shell with the larger mass of cream contained in the can so that when the device is lifted, the easy separation of the measured quantity of cream from the cream contained in the can will result. After removing the device, the operator presses with his thumb on the finger piece 20 after loosening the screw 23, thereby projecting the plunger head 15 outwardly in the shell 5 and dispelling the ice cream therefrom into a plate, box or other receptacle. By reason of the contact of alcohol with the inner face of the metal disc 18, the sticking or adhesion of the cream to the outer face of this disc is prevented so that in this dispelling action, the cream will readily free itself from the outer face of the disc 17.

In cases where several different kinds of cream are desired, a predetermined quantity of one kind of cream may first be collected within the outer end of the shell 5 by engaging the set screw 13 with one of the outer seats 22. After the shell has been filled with this one kind of cream to the extent limited by the position of the plunger head 15 the set screw 23 is slightly loosened but without disengaging the same from the groove 21, and said plunger then moved inwardly in the shell 5 until the screw is opposite the next seat 22. After tightening the screw the shell 5 is forced into another can of cream so that a second flavor of cream will be collected in said shell. By repeating this operation and again adjusting the position of the plunger 15 in the shell 5, a third kind of cream may be collected within the shell. Thereafter, the plunger is operated to expel the several layers of cream superimposed upon each other from the shell or cylinder 5 in the manner above explained. It will be understood that although I have illustrated only two of the longitudinal grooves 21 with the differently spaced seats 22 in the accompanying drawing, any desired number of these grooves having relatively different spacing of the seats 22 may be provided.

From the foregoing description considered in connection with the accompanying drawing, the construction, manner of operation and several advantages of the device will be clearly and fully understood. It will be seen that I have produced an ice cream disher which is of relatively simple construction and whereby the removal of ice cream in measured quantities from the can or container can be rapidly effected. Also, it is to be noted that by the detachment of the cylinder or shell 5 from the flange 10 of the handle member 8 and the removal of the finger piece 20 from the end of the plunger rod, the several parts can be entirely separated from each other, whereby they may be easily and thoroughly cleaned, thus insuring the maintenance of the device in an entirely sanitary condition. It will be apparent that the shell 5 can be of any desired capacity, and that the cutting knives 24 may be of various other forms and otherwise arranged than as herein disclosed. Further, it is manifest that the various other structural features of the device are susceptible of more or less modification in form, construction and arrangement, and I therefore reserve the privilege of resorting to all such legitimate changes as may be fairly embodied within the spirit and scope of the invention as claimed.

I claim:

1. An ice cream disher comprising a cylindrical handle member provided at one of its ends with a hand-grip projecting laterally from one side and beyond the upper end thereof adapted to be engaged with the palm of the hand and a finger piece projecting laterally from the end of the handle member on the opposite side thereof, an ice cream receiving shell and means for detachably connecting the shell to the other end of said handle member, a manually operable plunger arranged within said shell and having a rod extending through said handle member and provided with a thumb piece on one end adjacent to said hand-grip and finger piece, said plunger rod being provided with a longitudinally extending groove and spaced concave seats along the length of said groove, and a set screw mounted in said handle member and engaged in said groove to prevent relative rotation of the handle member and plunger rod, said screw adapted to be adjusted into binding engagement upon one of the seats to fix the plunger in adjusted position within said shell.

2. An ice cream disher comprising a tubular handle member, an ice cream receiving shell and means for connecting said shell to one end of the handle member, a hollow plunger rod movable through said handle member and having a head on one end reciprocating within said shell, a concave sheet metal disc closing one side of said head, said plunger rod and the head adapted to receive alcohol, and a removable closure for the other end of said plunger rod.

3. An ice cream disher comprising a tubular handle member and an ice cream receiving shell connected thereto, a hollow plunger rod movable through said handle member and having a closed head on one end reciprocating within said shell, said plunger rod and head adapted to receive a liquid, and a closure member for the other end of said plunger rod for maintaining the liquid therein.

4. An ice cream disher comprising a tubular handle member and an ice cream receiving shell connected thereto, a plunger rod movable through said handle member and having a head on one end reciprocating within said shell, and one or more knife members secured to the inner wall of the shell adjacent to its open end and projecting toward the center of the shell.

5. An ice cream disher comprising a tubular handle and an ice cream receiving shell connected thereto, a plunger rod movable through said handle member and having a head on one side reciprocating within said shell, said plunger rod having a plurality of grooves extending longitudinally thereof and each groove provided with a set of differently spaced seats, and a projecting member extending through the handle member adapted to engage one of said grooves and within the seats thereof.

6. An ice cream disher comprising a cylindrical tubular handle member provided at one of its ends with an ice cream receiving shell, a hand grip on the other end of said cylindrical handle extending laterally thereof and outwardly from the end of the cylindrical tubular handle to provide a fixed finger engaging portion at the side of the cylindrical handle and having a fixed palm engaging portion integral therewith spaced from the fixed finger receiving portion substantially the distance of the grip of the user, a fixed finger grip on the opposite side of said cylindrical handle member substantially in line with the finger engaging portion on the fixed hand grip, a plunger in the ice cream receiving shell, said plunger having a rod extending outwardly through said cylindrical handle, and a thumb piece on said rod adapted to be engaged by the thumb of the hand grasping said hand grip and finger piece for pressing the plunger from the inner end of the ice cream receiving shell to the outer end thereof.

In testimony that I claim the foregoing as my invention, I have signed my name hereto.

JOHANNES SCHLOEMER.